United States Patent [19]
Paige

[11] Patent Number: 5,697,228
[45] Date of Patent: Dec. 16, 1997

[54] GAS MANUFACTURE

[75] Inventor: Catharine S. Paige, Ascot, England

[73] Assignee: The BOC Group plc, Windlesham, England

[21] Appl. No.: 747,945

[22] Filed: Nov. 12, 1996

[30] Foreign Application Priority Data

Nov. 17, 1995 [GB] United Kingdom ............... 9523573

[51] Int. Cl.$^6$ ........................................................ F25J 1/00
[52] U.S. Cl. ........................................ 62/615; 62/46.1
[58] Field of Search ................................ 62/46.1, 615

[56] References Cited

U.S. PATENT DOCUMENTS

| | | | |
|---|---|---|---|
| 2,952,986 | 9/1960 | Spalding | 62/615 |
| 2,960,834 | 11/1960 | Kirkpatrick | 62/615 |
| 4,717,406 | 1/1988 | Giacobbe | 62/46.1 |
| 5,063,747 | 11/1991 | Jones et al. | 62/46.1 |

*Primary Examiner*—Ronald C. Capossela
*Attorney, Agent, or Firm*—R. Hain Swope; Salvatore P. Pace

[57] ABSTRACT

A method of manufacturing a breathable, life-supporting cryogenic liquid mixture including the steps of: producing a stream of treated natural air having substantially all the carbon dioxide and moisture removed therefrom; admixing a quantity of mixing gas containing nitrogen in a proportion greater than natural air thereby to producing a product gas mixture having a desired oxygen/nitrogen ratio and liquefying this said mixture in a heat exchanger against a suitable chilling fluid.

9 Claims, 3 Drawing Sheets

GAS MANUFACTURE

The present invention relates to cryogenic liquid manufacture and relates particularly, but not exclusively, to the manufacture of breathable, life-supporting gas mixtures for use in cryogenic cooling apparatus.

BACKGROUND OF THE INVENTION

When cryogenic liquids, such as nitrogen, are used as refrigerants, there is always an associated hazard of asphyxiation for persons entering a refrigeration unit where is a high concentration of the vaporized liquid. Alternatively, the use of liquid oxygen as the refrigerant entails the danger of enhanced combustibility. Consequently, the use of a cryogen which would be breathable and life-supporting when vaporized and yet would pose no enhanced fire risk is clearly desirable. Such cryogens are known, but present methods of producing them present many problems. For example, mixtures are often made in a batch process, by mixing the pure components by weight which has intrinsic problems of accuracy of the mixture composition and of ensuring that adequate mixing has taken place.

In accordance with the present invention, there is provided a method of manufacturing a breathable, life-supporting cryogenic liquid mixture which reduces and possibly eliminates the above-mentioned problems.

BRIEF SUMMARY OF THE INVENTION

The present invention provides a continuous or substantially continuous method of manufacturing a breathable, life-supporting cryogenic liquid mixture comprising the steps of: compressing a quantity of natural air; treating the compressed air to remove substantially all of any moisture and carbon dioxide therefrom; providing a quantity of a mixing gas comprising nitrogen present in a proportion greater than that present in natural air; and admixing a portion of said mixing gas with at least a portion of the compressed moisture and carbon dioxide reduced natural air, thereby producing a product mixture having a desired oxygen content, and chilling the product mixture to a cryogenic temperature, thereby liquefying it.

BRIEF SUMMARY OF THE DRAWINGS

The following drawings are illustrative of embodiments of the invention and are not intended to limit the invention as encompassed by the claims forming part of the application.

DETAILED DESCRIPTION OF THE PREFERRED EMBODIMENTS

The initial step in the process of the invention provides a quantity of natural air under pressure which has been treated to remove substantially all of any moisture and carbon dioxide therefrom. A particularly convenient means of providing such treated air is to obtain it from a conventional air separation apparatus since removal of moisture and carbon dioxide from air is a typical first step in such apparatus. The mixing gas which is combined with the treated air in accordance with the present method may also conveniently be obtained from a conventional air separation unit ("ASU") by further treating air which has been treated to remove moisture and carbon dioxide to remove at least a portion of the oxygen therefrom. The techniques whereby air is so treated are well known to those skilled in the art and need not be detailed herein.

The mixing gas may also be nitrogen or a nitrogen-enriched gas obtained from an ASU, or nitrogen at pressure from a source of liquid nitrogen. The compressed, treated air and the mixing gas are combined in a proportion such that the final oxygen content is less than air, but not less than about 14 percent by volume. This is carried out on a continuous or substantially continuous basis by monitoring the oxygen content of the mixture utilizing conventional equipment well known for such purposes and adjusting the proportion of the mixing gas relative to the treated air accordingly.

The step of chilling the mixture produced in accordance with the method of the invention is conveniently carried out by passing the mixture through a heat exchanger and heat exchanging it with a quantity of cryogenic chilling fluid so that it is chilled to a temperature such that it is liquefied, preferably to a sub-cooled temperature. Preferably, the temperature of the mixture is monitored and the flow of cryogenic fluid adjusted so that the product will reach the desired temperature to cause it to liquefy. The cryogenic chilling fluid may advantageously be nitrogen or a nitrogen-rich fluid obtained from a conventional cryogenic air separation unit. The vaporized nitrogen or nitrogen-enriched gas exiting the heat exchanger may conveniently be utilized as the mixing gas. The advantages of operating the process of the present invention in conjunction with an ASU will be readily apparent to those of ordinary skill in the art.

Figure 1:
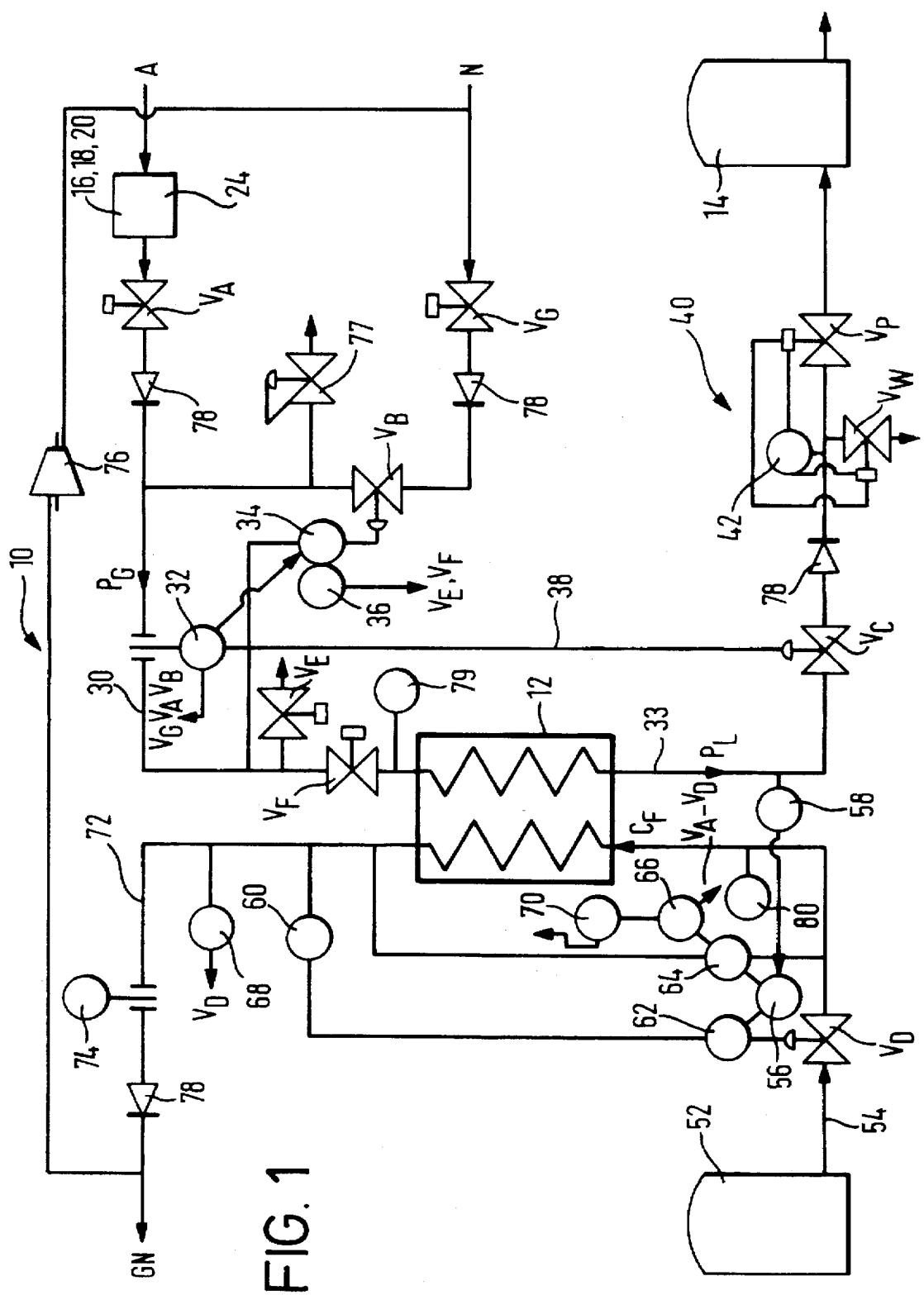
FIG. 1 is a schematic representation of an apparatus suitable for carrying out the present invention.

Referring to FIG. 1, an apparatus 10 for producing a breathable, life-supporting cryogenic gas comprises a source of natural air A and nitrogen N, chilling means 12 for condensing a mixture of the gases and storage means 14 for the temporary storage of the condensate before use thereof. Air A to be supplied to the apparatus is first treated to form treated natural air by removing substantially all of any moisture and carbon dioxide from it and compressing it in a manner well known to those skilled in the art. If necessary, a particle filtration step may also be employed. A typical example of an apparatus suitable for carrying out this process step comprises a series arrangement shown schematically in FIG. 1 and indicated by the reference 24 comprising, in sequence, a standard filter 16, compressor 18 and separator system 20 as used to pre-treat normal atmospheric air (by removal of water vapor and carbon dioxide therefrom) before it is fed to an ASU. Indeed, this pre-treatment process step may be carried out by such an arrangement when sized to provide treated air to both the process of the present invention and a standard ASU. Details of the integration of the present apparatus 10 with a standard ASU 22 are disclosed later herein.

Figure 2:
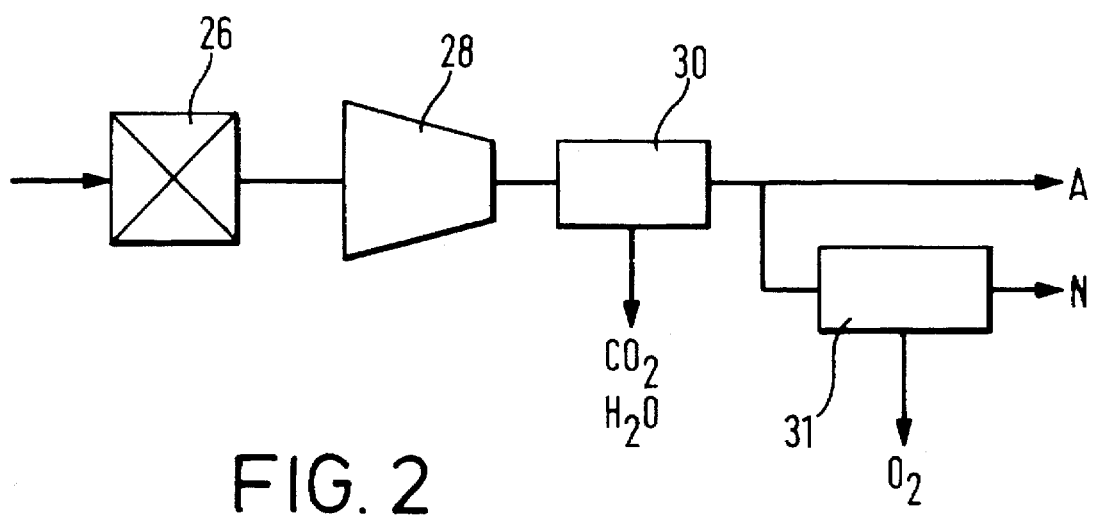
FIG. 2 is a schematic representation of an apparatus suitable for generating the desired gas flows for introduction into the apparatus of FIG. 1.
Figure 3:
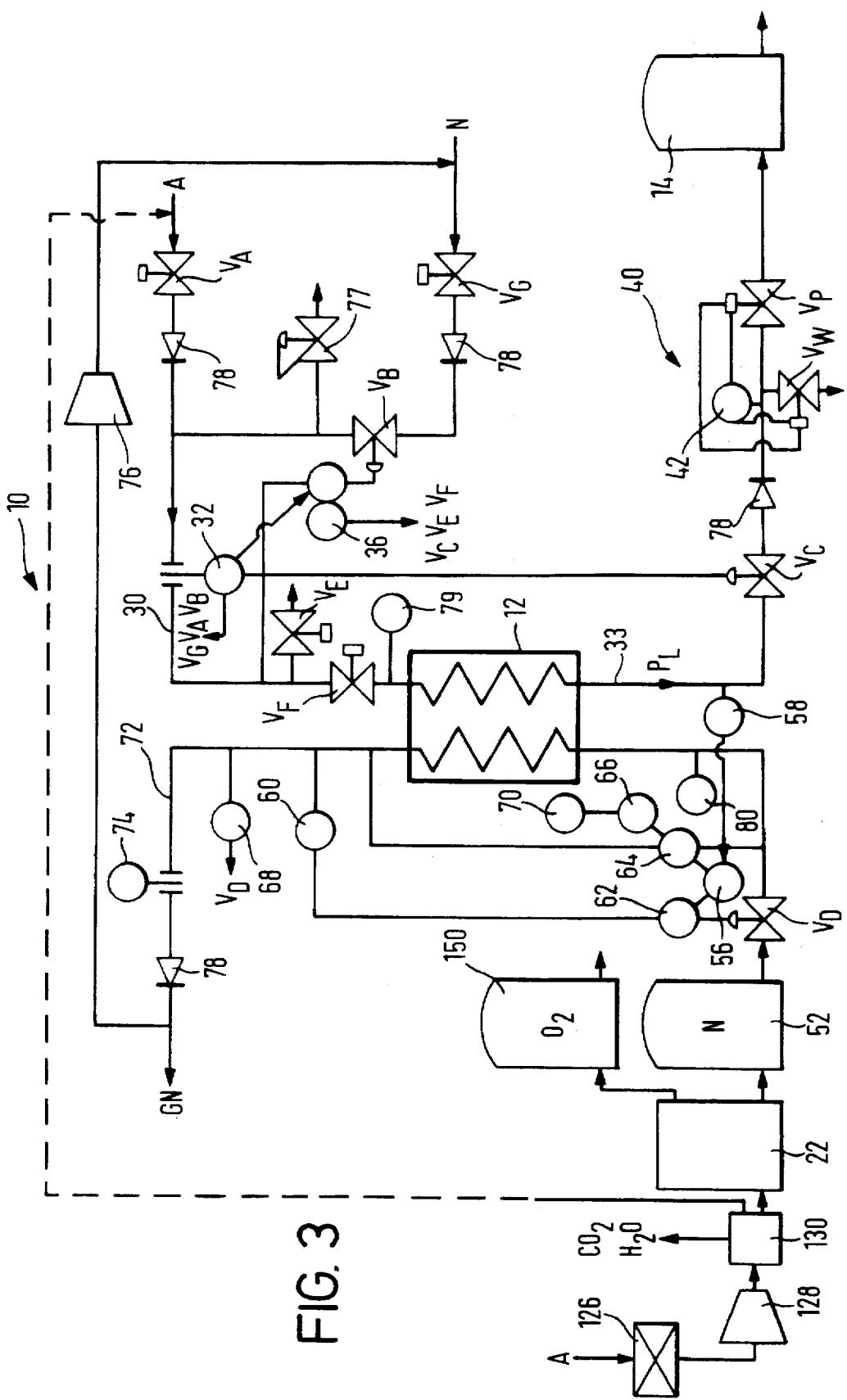
FIG. 3 illustrates the integration of the present invention with a commercial air separation unit (ASU).

Alternatively, the arrangement 24 may be provided for the sole purpose of supplying compressed, carbon dioxide and moisture free treated natural air A to the present apparatus 10. A still further alternative is illustrated in FIG. 2 from which it will be appreciated that streams A and N may be generated by filtering natural air in filter 26, compressing it in compressor 28 and directing it to a first filtration device 30 for the removal of carbon dioxide and moisture before splitting the flows such that a portion is directed to a further separation device 31 for the removal of at least some of the oxygen therefrom and, hence, produce stream N. Such separation devices 30, 31 may comprise simple membrane or adsorption apparatus well known to those skilled in the art and therefore not described further herein. Further possible sources for stream N include vaporizing liquid nitrogen generated as a product or by-product of another related or unrelated process. One such example of this alternative is illustrated in FIG. 3, which will be discussed in detail later herein.

It will be appreciated that the present invention is aimed at providing a cryogenic liquid having an oxygen less than that of natural air which is, therefore, not a fire hazard. Consequently, while stream N is described as being a nitrogen stream, it will be appreciated that, as its function is to dilute the oxygen concentration of natural air A, it might itself contain components other than nitrogen. However, so long as such other components present no further hazard to the user, their presence may be tolerated. Consequently, mixing gas N may comprise substantially pure nitrogen or a nitrogen-rich mixture of gases.

Referring now once again to FIG. 1, streams A and N are passed through stop valves $V_A$ and $V_G$, respectively, before being mixed together in a ratio determined by the flow-rate of the nitrogen through a flow control valve $V_B$ thereby producing a gaseous product mixture $P_G$ typically at about 286K and 3.5 barg. Once mixed, mixture $P_G$ is passed along supply pipe 30 having, in flow series, a flow indicator/controller 32, an oxygen analysis controller 34, vent valve VE and a control valve $V_F$. A high/low analysis switch 36 is operably connected to the oxygen analyzer/controller 34 so as to initiate operation over valves $V_E$ and $V_F$ at the inlet thereof. In operation, the flow of product mixture $P_G$ through the apparatus 10 is controlled by operating valve $V_C$ so as to allow the desired flow rate to exit chiller 12. Flow indicator/controller 32 is operably linked to valve Vc via line 38 and acts to detect the flow rate of product mixture $P_G$ through pipe 30 and also initiates control over valves $V_A$, $V_B$ and $V_G$ so as to cause the product supply rate to match the output demand. Under normal operating conditions, the oxygen concentration of the product mixture is monitored by oxygen analysis controller 34 which initiates control over valve $V_B$ so as to alter the ratio of natural air A to mixing gas N in the supply. In the event that the oxygen percentage falls outside pre-determined boundaries, high/low oxygen analysis switch 36 operates to initiate control over valves $V_E$ and $V_F$ so as to prevent any defective product being supplied from the chiller by causing the defective product to be vented via valve $V_E$. The flow control step may be temporarily over-ridden during venting of defective gaseous product $P_G$.

Under normal operation, product gas $P_G$ is passed into chiller 12 which takes the form of, for example, a cryogenic heat exchanger and is heat exchanged with a cryogenic cooling fluid $C_F$ typically at about 79K and 2 barg, thereby to liquefy the product gas. Once liquefied, liquid product gas $P_L$ is directed through outlet pipe 33 to liquid product buffer 14 via a further purity control system 40, which prevents any defective liquid product being, supplied to the buffer 14. The purity control system 40 conveniently comprises a further oxygen analyzer 42 and valves $V_P$ and $V_W$ which, in operation, collectively act to allow or inhibit flow of liquid to the buffer 14 as and when necessary. Liquid which does not meet specifications may be vented to the atmosphere via valve $V_W$ or directed for disposal in any one of a number of ways.

While it will be appreciated that the chilling medium $C_F$ may comprise any one of a number of fluids having a sufficiently low temperature to facilitate liquefaction of the product gas, it has been found that nitrogen-rich waste or product nitrogen from a cryogenic air separation apparatus 22 is particularly suitable for this purpose. Liquid nitrogen has sufficient chilling capacity to provide a significant degree of product sub-cooling which is extremely desirable if the product is to be stored for any length of time. Also, its high chilling capacity facilitates the production of product at a rate somewhat higher than might be achievable with some alternative chilling systems. The liquid nitrogen $L_N$ may be supplied from a liquid store 52 or a liquefier and is typically passed to the chiller 12 at about 79K and 2 barg. A flow control valve $V_D$ is provided in inlet line 54 and acts to allow or inhibit the flow of chilling nitrogen in response to signals from a controller 56 operably connected for receiving level signals from differential pressure monitor 64 positioned for monitoring the level of chilling liquid in the boiling passage of the chiller 12 which is arranged with generally vertical passages therethrough. The set-point of the level controller is determined by a temperature signal from temperature monitor 58 positioned for monitoring the temperature of product $P_L$ as it exits the heat exchanger 12. Control is initiated to increase the level and thereby flow rate of chilling fluid if the temperature of the product $P_G$ rises above a pre-determined level.

Additional control devices may include a signal select device 62 which acts to decrease the flow if the chilling fluid exits the chiller at a temperature below a predetermined level as detected by temperature monitor 60 positioned to monitor the temperature of the chilling fluid as it exits the heat exchanger 12 and a low level switching system comprising the level transmitter 64 monitoring the fluid level on the chilling fluid side of heat exchanger 12 being operably connected to a low level switching device 66 having control over valves $V_A$ to $V_D$ inclusive to close the apparatus down should the chilling fluid level in the boiling passage of the chiller drop below a predetermined valve. A further safety feature may be provided in the form of low temperature detector 68 which is operably connected to valve $V_D$ for the control thereof should the temperature of the spent chilling fluid $C_F$ fall below a pre-determined value, thereby indicating a system failure. A manually operated switch 70 may also be provided to override either or both of these systems and initiate control over the flow of chilling fluid $C_F$. Waste chilling fluid $C_F$ is passed for disposal or further use via line 72 and flow indicator 74. If liquid nitrogen is being used as the chilling fluid, the waste gas which is typically at 276K and atmospheric pressure may be compressed in compressor 76 and used as the source of nitrogen rich gas N. The apparatus shown in FIG. 1 also includes a pressure relief valve 77, several non-return valves 78, and temperature indicators 79 and 80 which respectively display the temperature of the gas mixture and the temperature of the liquid nitrogen upstream of their respective entries into the chiller 12.

Referring now to FIG. 3, from which it will be appreciated that the present invention lends itself to integration with a commercial ASU suitably sized so as to provide surplus treated air A and nitrogen product or by-product which forms the chilling fluid $C_F$ of the present invention and possibly the source of mixing gas N. Integration is fairly simple and involves the selection of air filter 126, compressor 128 and carbon dioxide/moisture remover 130 stages having sufficient capacity to provide pre-treated air to both the ASU 22 and air inlet A of the present invention. Preferably, the ASU is operated for the production of oxygen product 150 and the nitrogen 52 is sent for use as the chilling fluid $C_F$ of the present invention. It will however be appreciated that one might still integrate the present invention with an ASU designed for the production of nitrogen product. However, it will be appreciated that some loss of product will result. Other features of the apparatus shown in FIG. 3 are the same as that shown in FIG. 1 and are indicated by the same reference numerals as used therein.

I claim:

1. A continuous method of manufacturing a cryogenic liquid mixture of a composition which is breathable and life supporting, comprising: compressing a quantity of natural air; treating the compressed natural air to remove substantially all of any moisture and carbon dioxide therefrom; providing a quantity of mixing gas containing nitrogen in a proportion greater than in natural air; admixing said mixing gas and said compressed, treated natural air in a proportion such that the resultant gas mixture contains a smaller proportion of oxygen than is present in natural air, but not less than about 14 percent by volume of oxygen; and chilling the gas mixture to a cryogenic temperature such that said gas mixture will liquefy.

2. A method in accordance with claim 1, additionally including the step of treating a portion of the compressed, treated natural air to remove at least a portion of the oxygen therefrom and using the resultant treated air as the mixing gas.

3. A method in accordance with claim 1, including the step of monitoring the oxygen concentration of the product mixture and modifying the proportion of the mixing gas to continuously achieve an oxygen content in the resultant gas mixture is a smaller proportion than is present in natural air, but not less than about 14 percent by volume.

4. A method in accordance with claim 1, wherein said resultant gas mixture is liquefied by chilling to a sub-cooled temperature.

5. A method in accordance with claim 1, wherein said resultant gas mixture is liquefied by passing through a heat exchanger and heat exchanging with a quantity of cryogenic chilling fluid.

6. A method in accordance with claim 5, including the step of monitoring the temperature of the liquefied product after the chilling step and controlling the flow of said cryogenic chilling fluid so as to maintain said temperature within a given temperature range.

7. A method in accordance with claim 6, wherein the cryogenic chilling fluid is selected from liquid nitrogen or a liquefied nitrogen-containing gas and said mixing gas is formed by passage of the cryogenic chilling fluid through the heat exchanger.

8. A method in accordance with claim 5, wherein said compressed, treated natural air is air which has been treated for introduction into an air separation apparatus, said mixing gas comprises cryogenic chilling fluid downstream of passage thereof through the heat exchanger and said cryogenic chilling fluid is liquid nitrogen product from said air separation apparatus.

9. A method in accordance with claim 1, wherein said mixing gas comprises vaporized liquid nitrogen at pressure.

* * * * *